United States Patent
Huang

(10) Patent No.: US 6,663,068 B2
(45) Date of Patent: Dec. 16, 2003

(54) STRUCTURE BEVERAGE HOLDER

(76) Inventor: Pei-Hsiu Huang, 4/ Fl, No. 12-1, Alley 15, Lane 214, Chung-Hsin Rd., Sec. 4, Sanchung City, Taipei (TW)

( * ) Notice: Subject to any disclaimer, the term of this patent is extended or adjusted under 35 U.S.C. 154(b) by 384 days.

(21) Appl. No.: 09/955,441

(22) Filed: Sep. 10, 2001

(65) Prior Publication Data

US 2002/0070324 A1 Jun. 13, 2002

(30) Foreign Application Priority Data

Dec. 12, 2000 (TW) .................................... 089221479 U

(51) Int. Cl.$^7$ ................................................. A47K 1/08
(52) U.S. Cl. ............................... 248/311.2; 248/227.3; 248/230.5; 248/292.12; 224/926
(58) Field of Search .......................... 248/311.2, 230.5, 248/231.61, 227.3, 292.12, 227.4; 224/414, 448, 926

(56) References Cited

U.S. PATENT DOCUMENTS

| | | | | |
|---|---|---|---|---|
| 2,013,192 A | * | 9/1935 | Smith |
| 2,454,732 A | * | 11/1948 | Cathey et al. |
| 2,552,590 A | * | 5/1951 | Ross |
| 3,881,677 A | * | 5/1975 | Ihlenfeld |
| 4,073,454 A | * | 2/1978 | Sauber |
| 4,878,642 A | * | 11/1989 | Kirby, Jr. |
| 5,484,128 A | * | 1/1996 | Franco, Sr. |
| 5,522,527 A | * | 6/1996 | Tsai |
| 5,603,477 A | * | 2/1997 | Deutsch |
| 5,653,365 A | * | 8/1997 | Lee |
| 5,669,536 A | * | 9/1997 | Wang |
| 5,738,322 A | * | 4/1998 | Huang |
| 5,823,488 A | * | 10/1998 | Nettekoven |
| 5,823,496 A | * | 10/1998 | Foley et al. |
| 5,996,957 A | * | 12/1999 | Kurtz |
| 6,082,583 A | * | 7/2000 | Bussell et al. |
| 6,092,776 A | * | 7/2000 | You |

* cited by examiner

Primary Examiner—Korie Chan

(57) ABSTRACT

An improved structure beverage holder in which the mounting plate of the beverage holder has disposed in its back surface a recess having formed within spur gear teeth or other similar gear teeth and a through-hole, thereby enabling the fastening and emplacement of an oblique-faced conical block, a C-shaped mount, and a reverse C-shaped mount constituting a first type of mounting frame such that the beverage holder is installed to an appliance for utilization at an inclined state on a tube or a rod. Or, the fastening and emplacement only involves the C-shaped mount and the reverse C-shaped mount to constitute a second type of mounting frame such that the beverage holder is fixed and installed to an appliance in a vertical state. Respectively hinged at the inner sides of two clip arms on the beverage holder, arc-shaped retaining elements can be folded downward, but automatically return upward to their original horizontal state. Disposed in the bottom mount base plate of the beverage holder is a downward cavity such that when a bottle, a can, a cup, or other similar container of the beverage is situated on the beverage container, the bottom section of the beverage container is nested in the cavity of the bottom mount, with the upper end or upper section supported or clamped tightly by the arc-shaped retaining elements of the two clip arms. As such, wobbling does not readily occur and any toppling is prevented, while installation and utilization remains convenient.

8 Claims, 8 Drawing Sheets

STRUCTURE BEVERAGE HOLDER

BACKGROUND OF THE INVENTION

A conventional beverage holder 1a, as indicated in FIG. 15, is comprised of a mounting plate 11a, a bottom mount 12a, two clip arms 13a, and a clip arm hinge rod 14. In the mounting plate body 110a of the said conventional beverage holder 1a, since a plurality of holes 111 are formed in the plate body 110a and, furthermore, no other installation or mounting components are present at its rear surface (as shown in FIG. 16), it is only possible to fasten it by screws for utilization to a vertical and flat surface in the interior of a room, the interior of a vehicle, or that of an appliance; or, following the placement of double-sided adhesive pads on the back surface of the said mounting plate body 110a, adhesively installed for utilization to a vertical and flat surfaced wall panel in the interior of a room, the interior of a vehicle, or that of an appliance; as this precludes installation for utilization on the tube or rods of appliances such as bicycles, wheel chairs, and infant carriages and, therefore, application is limited. Additionally, the bottom mount plate 121 of the said conventional beverage holder 1a is of a rudimentary arrangement and since no assistive clamping components are present on its two clip arms 13a, even though the said two clip arms 13a can be fully adjusted to a "maximum narrow and smallest" configuration, when a small nursing bottle or other bottle or can of beverage is therein situated, since the two clip arms 13a are incapable of securely clamping the said bottle or can of beverage and the periphery of the bottom mount 12a cannot support the bottom edges of the said bottle or can of beverage, wobbling and toppling readily occur, resulting in inconveniences during utilization. In view of this, the inventor of the invention herein conducted research and testing that culminated in the innovative development of the improved structure beverage holder of the invention herein.

SUMMARY OF THE INVENTION

The objective of the invention herein is to provide an improved structure beverage holder in which the mounting plate is not only capable of being screw fastened or adhesively installed for utilization to a vertical and flat surfaced wall panel in the interior of a room, the interior of a vehicle, or that of an appliance, but is also capable of being fastened and installed by means of a first or a second type of mounting frame at the back surface of the said mounting plate and, therefore, fixed and installed in an inclined or vertical state for utilization onto a tube or a rod of an appliance.

Another objective of the invention herein is to provide an improved structure beverage holder wherein when a bottle, a can, or other similar container of beverage is situated therein, the upper end or upper section of the said beverage containers is tightly clamped and, furthermore, their bottom sections are supported such that wobbling and toppling does not readily occur.

The brief description of the drawings below are followed by the detailed description of the invention.

DETAILED DESCRIPTION OF THE INVENTION

Figure 1:
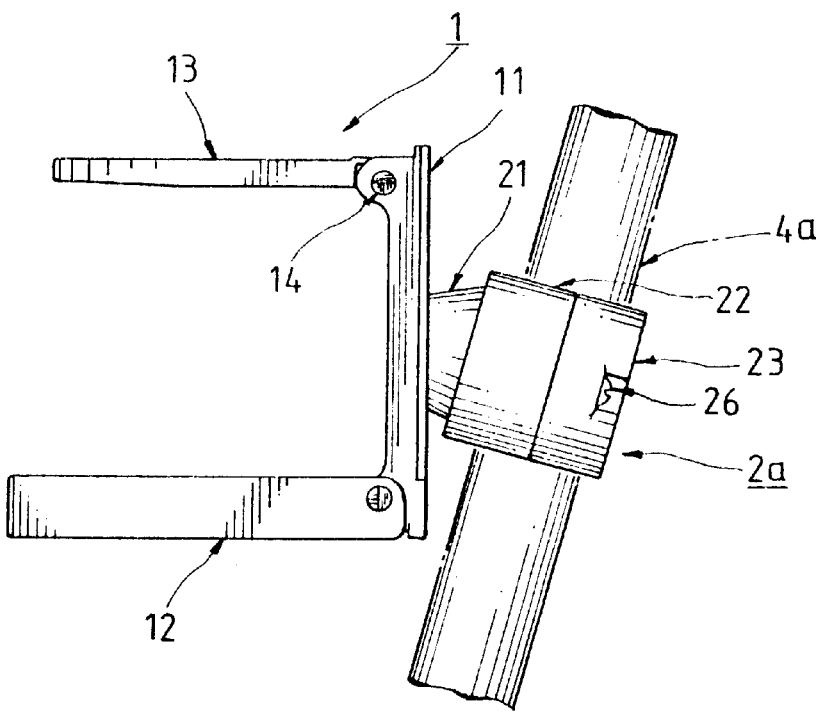
FIG. 1 is an orthographic drawing of the first embodiment of the invention herein, as viewed from the right side to illustrate installation.
Figure 2:
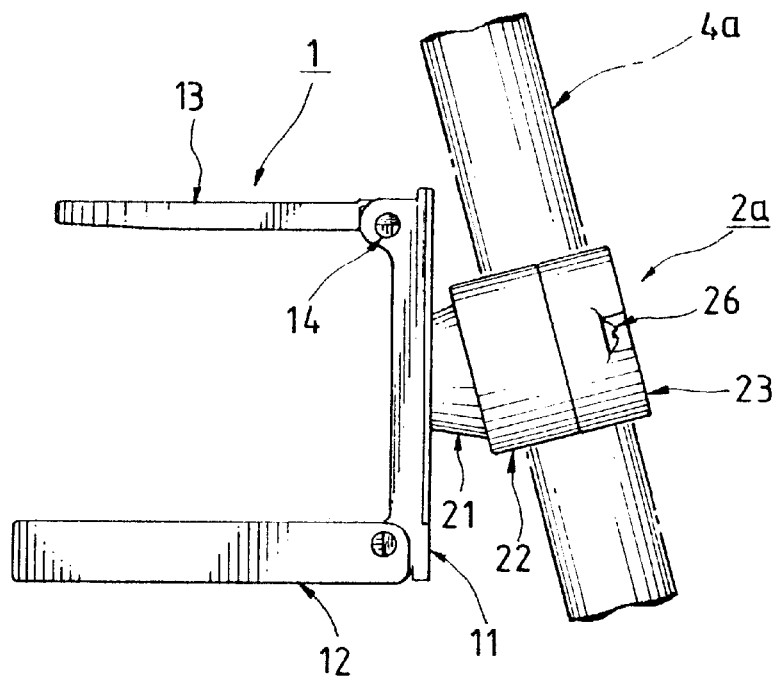
FIG. 2 is an orthographic drawing of the first embodiment of the invention herein as viewed from the right side to illustrate another example of installation.
Figure 3:
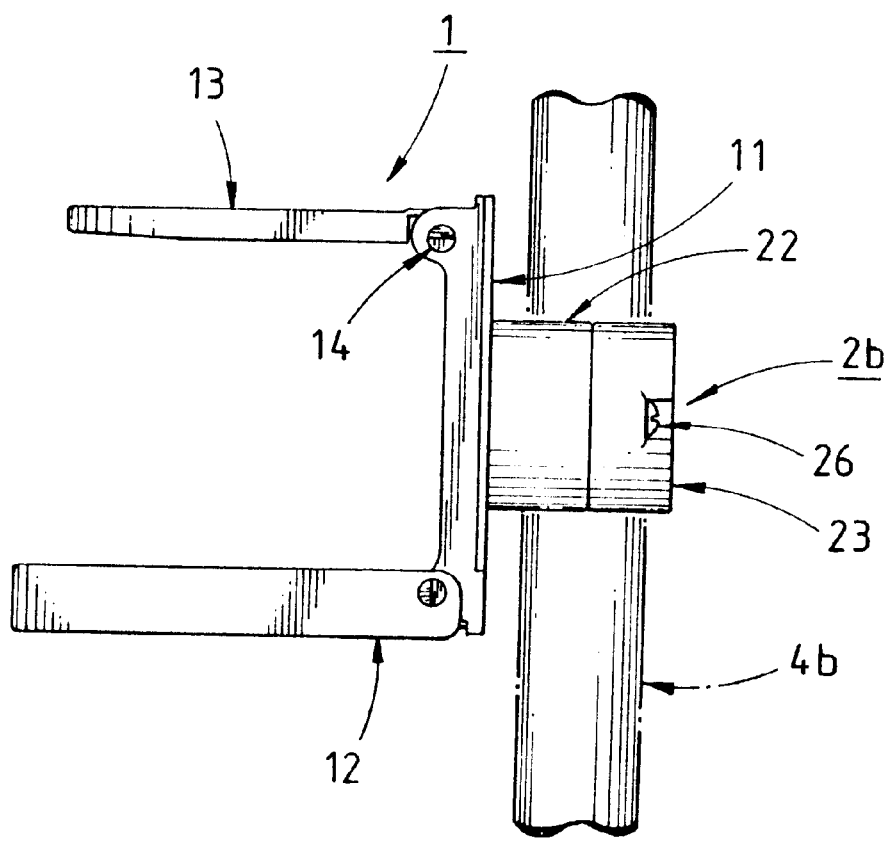
FIG. 3 is an orthographic drawing of the second embodiment of the invention herein, as viewed from the right side to illustrate installation.
Figure 4:
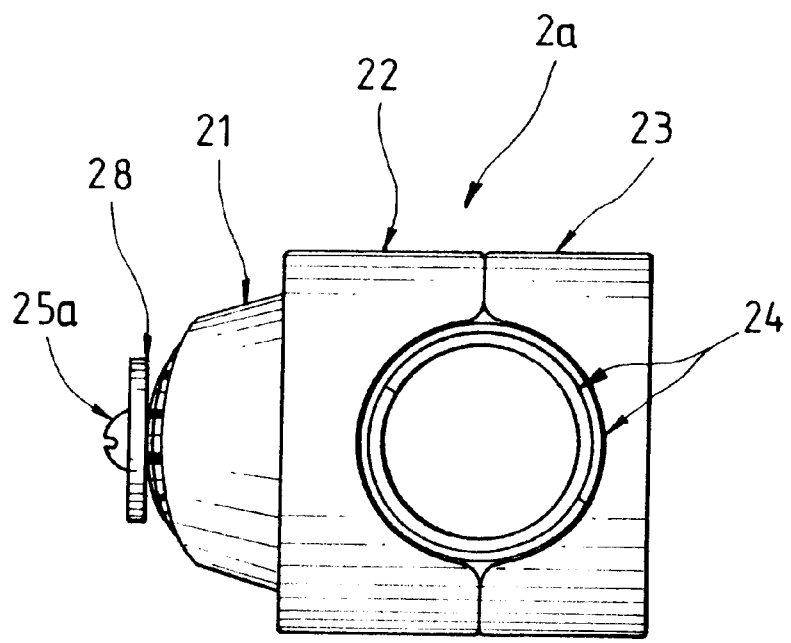
FIG. 4 is an orthographic drawing of the first type of mounting frame of the invention herein, as viewed from the top.
Figure 5:
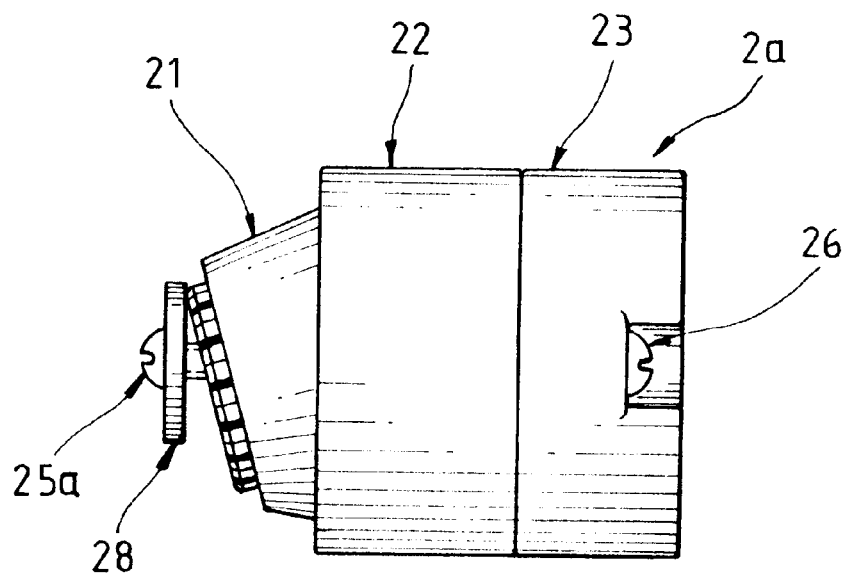
FIG. 5 is an orthographic drawing of the first type of mounting frame of the invention herein, as viewed from the right side.
Figure 6:
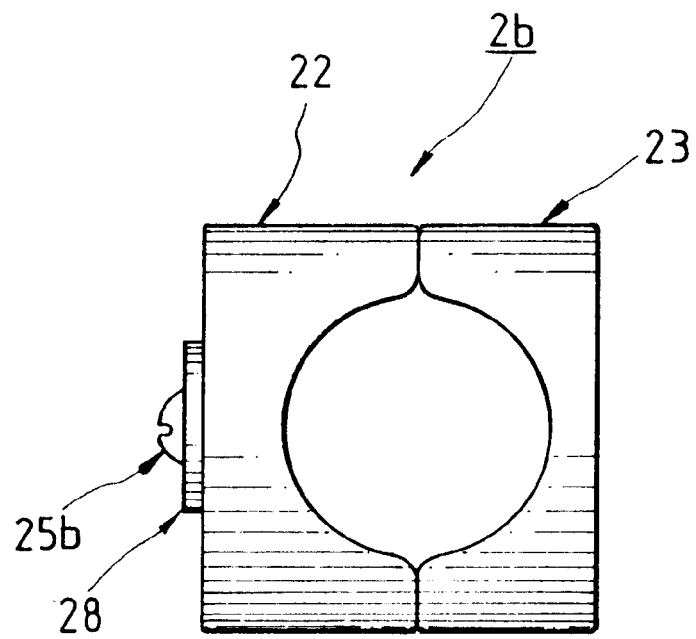
FIG. 6 is an orthographic drawing of the second type of mounting frame of the invention herein, as viewed from the top.
Figure 7:
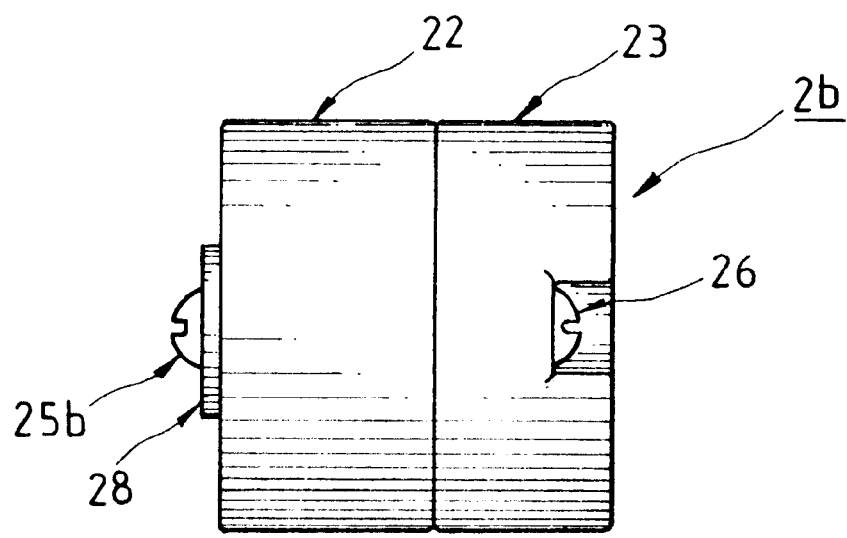
FIG. 7 is an orthographic drawing of the second type of mounting frame of the invention herein, as viewed from the right side.
Figure 10:
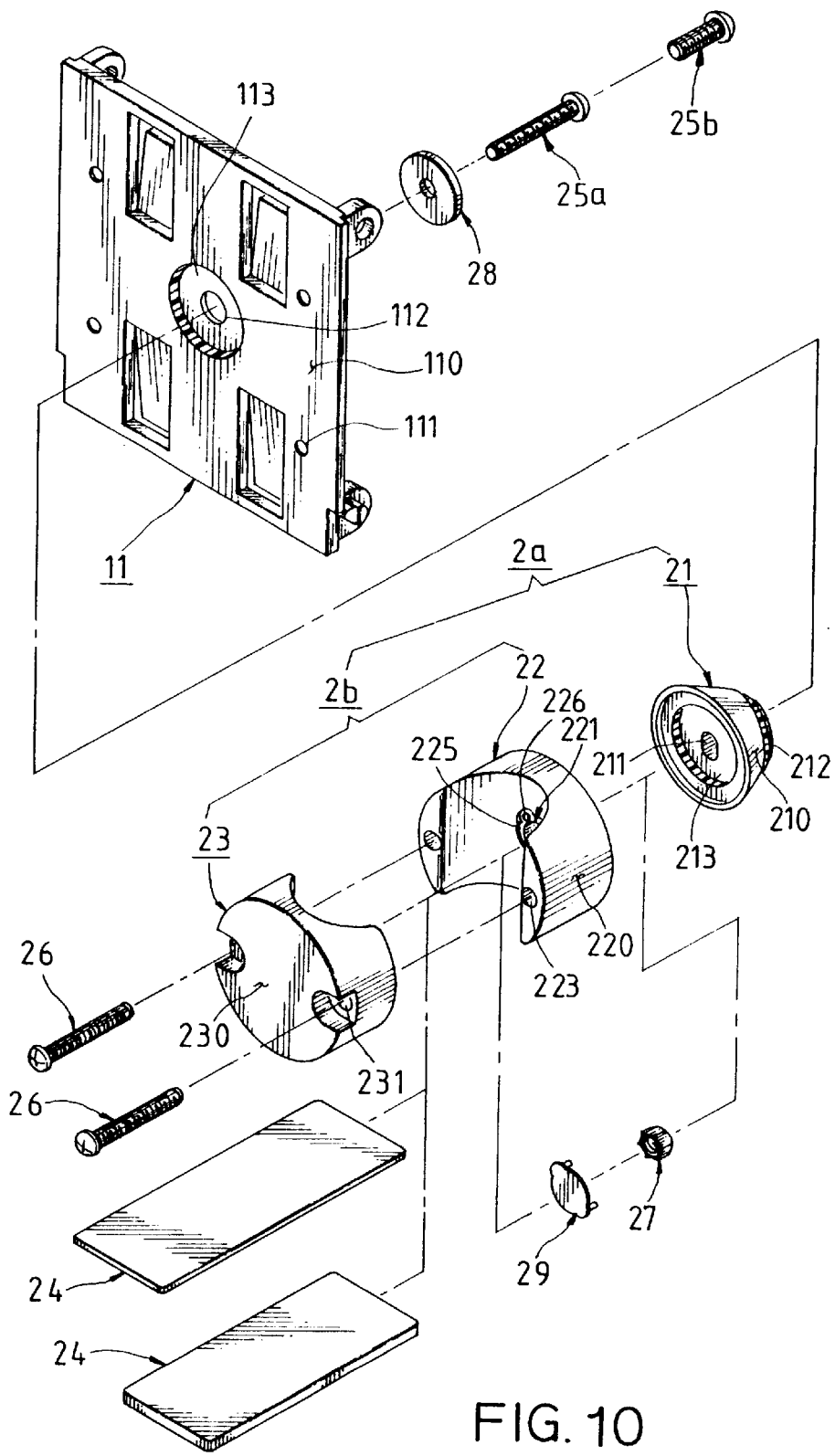
FIG. 10 is an exploded drawing of the beverage holder mounting plate and the first and second type of mounting frame of the invention herein.

Referring to FIG. 10 as well as FIG. 1, FIG. 2, and FIG. 3, the beverage holder 1 of the invention herein is comprised of a mounting plate 11, a bottom mount 12, two clip arms 13, and a clip arm hinge rod 14; disposed in the back surface of the mounting plate 11 main body 110 is a recess 113 having spur gear teeth or other similar gear teeth formed along its inner edge and a circular or elongated through-hole 112 (as shown in FIG. 10) that accommodates the emplacement of an oblique-faced conical block 21, a C-shaped mount 22, and a reverse C-shaped mount 23 constituting a first type of mounting frame 2a (as shown in FIG. 4 and FIG. 5) which enables the installation of the said beverage holder 1 to an appliance (such as a bicycle, a wheel chair, or an infant carriage, etc.) at a forward or rearward inclined state on a tube 4a or a rod (as shown in FIG. 1 and FIG. 2) such that a nursing bottle or other beverage such as mineral water or soft drink can be situated on the said beverage holder 1 and utilized as the appliance is moved; at the same time, the said recess 113 and through-hole 112 also accommodates the emplacement of the C-shaped mount 22 and the reverse C-shaped mount 23 constituting a second type of mounting frame 2b (as shown in FIG. 6 and FIG. 7) which enables the installation of the said beverage holder 1 to the said appliance in a vertical state on the tube 4b or the rod (as shown in FIG. 3) such that a nursing bottle or other beverage such as mineral water or soft drink can be situated on the said beverage holder 1 and utilized as the appliance is moved.

The said oblique-faced conical block 21, as shown in FIG. 10, has an oval-shaped or round-shaped through-hole 211 in the center of its block body 210, which has formed along the outer periphery of a projecting rim 212 spur gear teeth or similar gear teeth at its smaller diameter end such that it can be inserted and conjoined into the recess 113 on the beverage holder 1 mounting plate 11; at the larger diameter end of the said body block 210 is a recess 213 having spur gear teeth or other similar gear teeth formed along its inner edge to enable the insertion and conjoinment of the C-shaped mount 22.

Figure 8:
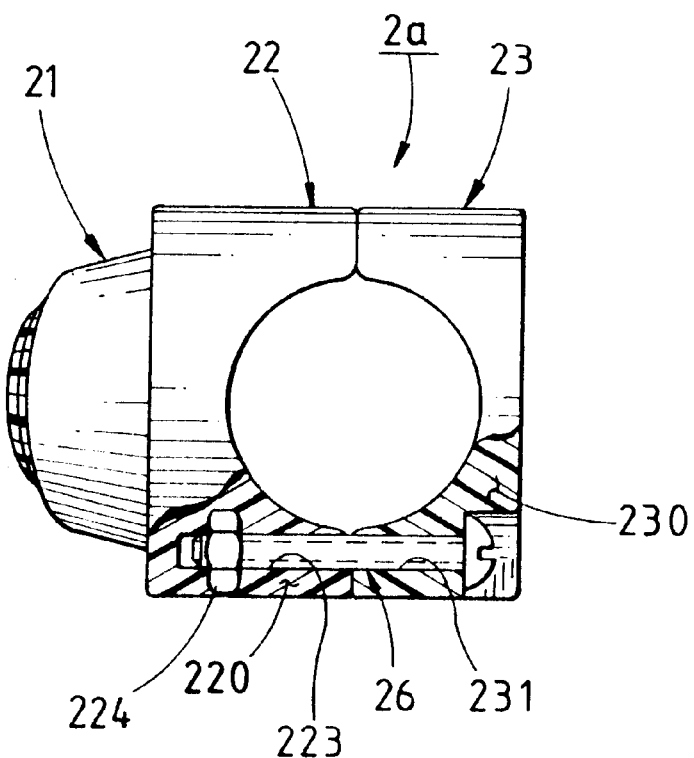
FIG. 8 is a partial cross-sectional drawing of the first type of mounting frame of the invention herein, as viewed from the top.
Figure 9:
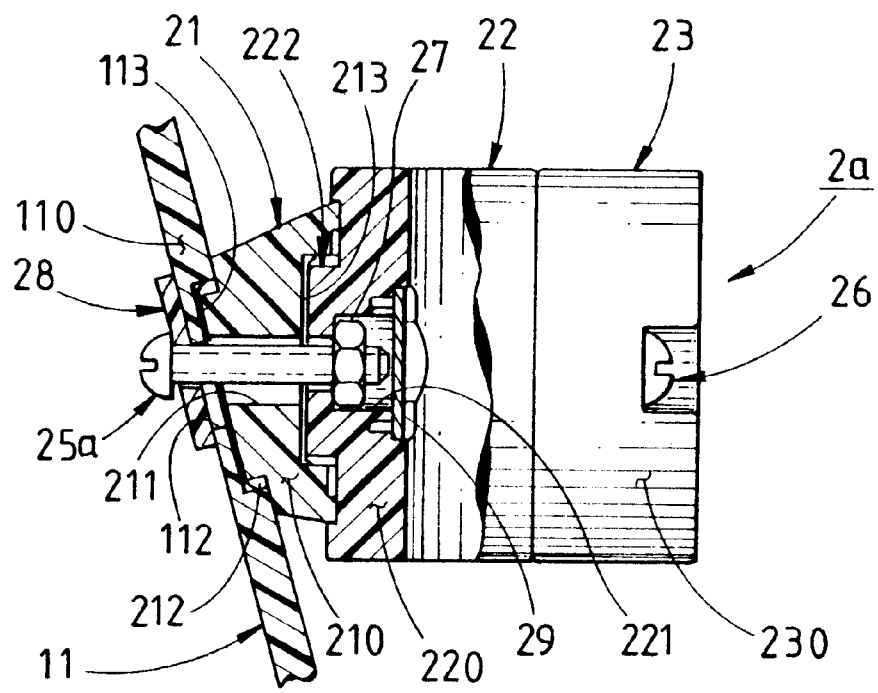
FIG. 9 is a partial cross-sectional drawing of the first type of mounting frame of the invention when fastened and conjoined into the mounting plate of the beverage holder.

The said C-shaped mount 22 has in its center a stepped through-hole 221 that enables the emplacement of a nut 27 in the C-shaped mount body 220, which has formed along the outer periphery of a projecting rim 222 (as shown in FIG. 9) spur gear teeth or similar gear teeth at one end such that it can be inserted and conjoined into the recess 213 of the said oblique-faced conical block body 210 or the recess 113 on the back surface of the beverage holder 1 mounting plate 110; and emplaced in a columnar passage 223 at each of the two sides of the said mount body 220 is a nut 224 (as shown in FIG. 8) that enables fastening and conjoinment to the inner side of the reverse C-shape mount 23 by two screws 26; the said stepped through-hole 221 has formed inside bearing edges 225 with two small columnar passage 226 (as shown in FIG. 10) that enable the insertion and installation of a cover plate 29, thereby facilitating the fastening and conjoinment to the said oblique-faced conical block body 210 and the said mounting plate body 110 of beverage holder 1 or directly to the said mounting plate body 110 of beverage holder 1 by screw 25a or 25b (as shown in FIG. 9).

The said reverse C-shaped mount 23 consists of a reverse C-shaped mount body 230, and on the said reverse C-shaped mount body 230 are two through-holes 231 aligned with the two columnar passages 223 on the said C-shaped mount body 231 that enable the insertion of the two screws 26 into the said two through-holes 231 for fastening and conjoinment to the said C-shaped mount body 220 (as shown in FIG. 8).

The projecting rim 212 of the said oblique-faced conical block 21 is inserted into the recess 113 in the back surface on the mounting plate 110 of beverage holder 1, then the projecting rim 222 on the said C-shaped mount 22 is inserted into the recess 213 on the said oblique-faced conical block 21, and after being ensleeved with a washer 28 and at the same time inserted through the said mounting plate 11 of beverage holder 1 and the said oblique-faced conical block 21, the screw 25a is then fastened to the nut 27 in the said C-shaped mount 22, following which the assemblage is collocated, utilizing the said reverse C-shaped mount 23 and the two screws 26, to fasten and install the said beverage holder 1 to an appliance (such as a bicycle, wheel chair, or infant carriage, etc.) at a forward or rearward inclined state on the tube 4a or a rod such that a bottle, a can, or a cup of beverage can be carried as situated on the said beverage holder 1 for utilization while accompanying the vehicle.

When the said oblique-faced conical block 21, the C-shaped mount 22, and the reverse C-shaped mount 23 are fastened, installed, and conjoined as previously described to the mounting plate 11 of beverage holder 1 to constitute the first type of mounting frame 2a arrangement on the said beverage holder 1, it can be fixed and installed to the said appliance for utilization at a forward or rearward inclined state on the tube 4a or a rod, as indicated in FIG. 1 and FIG. 2; when the said beverage holder 1 is fixed and installed to the said appliance for utilization in a vertical state on the tube 4b or a rod, then, as indicated in FIG. 3, only the C-shaped mount 22 and the reverse C-shaped mount 23 are fastened and conjoined to the said mounting plate of beverage holder 1 by the shorter screw 25b (as shown in FIG. 10) ensleeved with the washer 28 to constitute the second type of mounting frame 2b arrangement on the said beverage holder 1 which, as indicated in FIG. 3, can be fixed and installed to the said appliance for utilization in a vertical state on the tube 4b or a rod; of these, since the structure of the C-shaped mount 22 and the reverse C-shaped mount 23 is similar to that of the first type of mounting frame 2a, the user has the option to change or alternate them as desired. In addition, the second type of mounting frame 2b can also be fixed and installed to the said appliance for utilization at a forward or rearward inclined state on the tube 4a or the rod. It is only necessary to fasten and install the said beverage holder 1 to the left or the right side of the said inclined tube 4a or rod and, furthermore, since the said beverage holder 1 is then adjustable by rotation towards the left or towards the right to achieve a vertical state, installation and utilization are quite convenient.

Although the tube 4a, 4b, or the rod of the bicycle, wheel chair, or infant carriage appliance may be of different diameters, the dimensions of the C-contoured indentation of the C-shaped mount 22 and the reverse C-shaped mount 23 can be such that its fabrication is based on the maximum diameter specification of the said appliances and, furthermore, accompanied by a minimum of two or more rubber plates 24 (as shown in FIG. 10) of equal or unequal thickness or equal or unequal length to provide the user a component of which one or more plates are rolled and afterwards placed between the C-shaped mount 22 and the reverse C-shaped mount (as shown in the arrangement of FIG. 4) to thereby accommodate fastening and installation to at least two or more types of tubes or rods having smaller specification diameters.

In addition to the said improved installation versatility, the beverage holder 1 of the invention herein has the following improved utilization conveniences.

Figure 14:
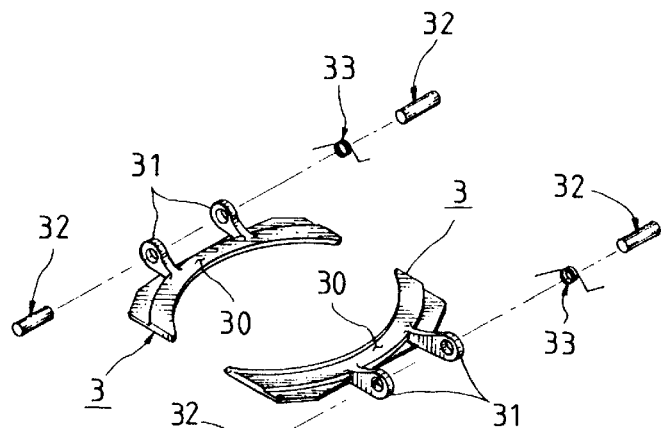
FIG. 14 is an exploded drawing of the two clip arm components of the beverage holder shown in FIG. 11.
Figure 11:
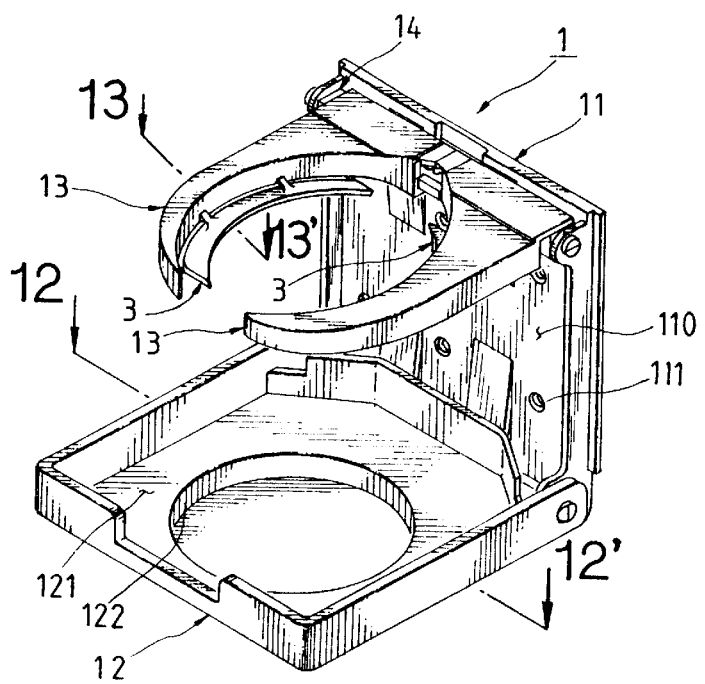
FIG. 11 is an isometric drawing of another embodiment of the beverage holder of the invention herein.
Figure 13:
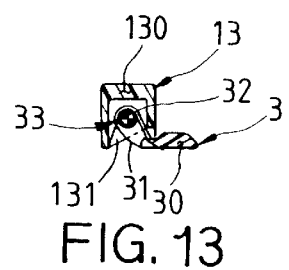
FIG. 13 is a cross-sectional drawing of FIG. 11 as viewed from the perspective of position 13–13'.
Figure 15:
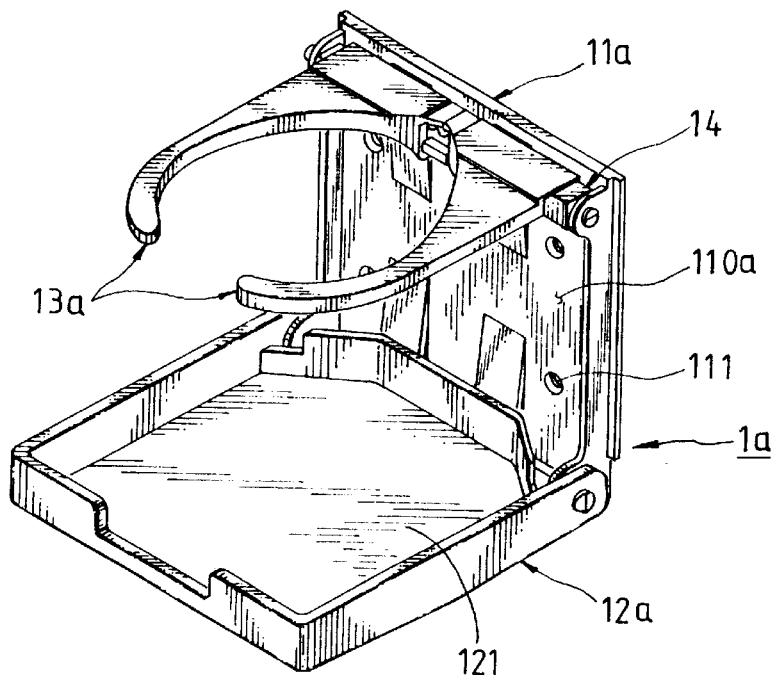
FIG. 15 is an isometric drawing of a conventional beverage holder.
Figure 16:
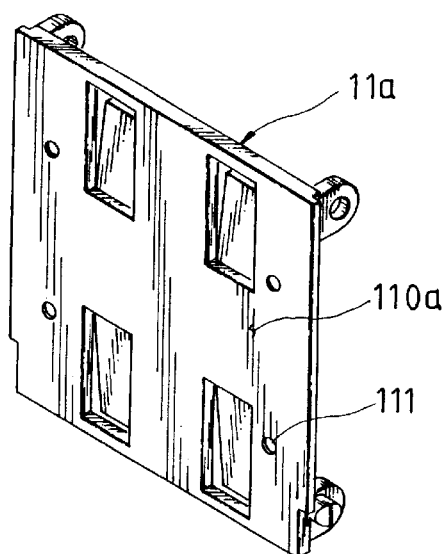
FIG. 16 is an isometric drawing of the mounting plate of a conventional beverage holder.

Referring to FIG. 11, FIG. 13, and FIG. 14, the two clip arms 13 of the beverage holder 1 of the invention herein are inverted U-shaped rods 130 and, furthermore, situated at the inner side of the said rods 130 are one or more ribs 131 (as shown in FIG. 13) that enable the hinging of an arc-shaped retaining element 3. Each said arc-shaped retaining element 3 consists of an arc-shaped plate body 30 that has formed a minimum of one hinge tab 31 or more at its outer side (as shown in FIG. 14); inserted through or extending from the said hinge tab 31 is a hinge shaft 32 that enables hinging at any of the clip arm 13 ribs 131 and, furthermore, are positioned at the inner side of said clip arm 13 to swing upward and downward, and each said arc-shaped retaining element 3 is, furthermore, equipped with a minimum of one transfer rod spring 33 (as shown in FIG. 14) that is sleeved onto the said hinge shaft 32 (as shown in FIG. 13); its transfer rod is maintained at the inner side of the said inverted U-shaped rod 130, and the other end of the transfer rod is placed onto the said arc-shaped plate body 30 of arc-shaped retaining element 3 such that the said arc-shaped retaining element 3 can be folded downward, but automatically returns upward to its original horizontal state due to the tension of the said spring 33.

Figure 12:
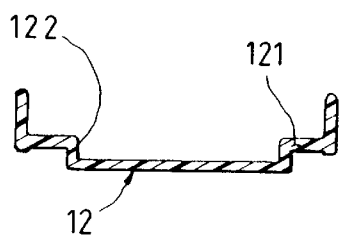
FIG. 12 is a cross-sectional drawing of FIG. 11 as viewed from the perspective of position 12–12'.

Referring to FIG. 11 and FIG. 12, the bottom mount 12 of the beverage holder 1 of the invention herein is improved by disposing a downward cavity 122 in its bottom mount body 121.

As such, the said two types of improved structure beverage holder 1 of the invention herein not only allows the installation of which particular type of mounting fixture, when a bottle, a can, a cup, or other similar container of beverage is situated therein, the bottom section of the said beverage container is nested in the cavity 122 of its bottom mount 12, with the upper end or upper section supported or clamped (tightly) by the arc-shaped retaining elements 3 of the two clip arms 13 and, as a result, wobbling does not readily occur and all. toppling is prevented, while installation and utilization are convenient.

What is claimed is:

1. A beverage holder comprising:

a mounting plate, a bottom mount, two clip arms, and a clip arm hinge rod, the mounting plate including a back surface having a recess with spur gear teeth formed along an inner edge of said recess and a through-hole, a mounting frame being comprised of an oblique-faced conical block body, a C-shaped mount body and a reverse C-shaped mount body, the C-shaped mount body having a screw inserted through a center hole, the center hole being topped with a cover plate, a projecting rim on the C-shaped mount body including spur gear teeth at one end of said projecting rim for selective engagement with either the oblique-faced conical body or insertion into the recess on the back surface of the mounting plate, and a columnar passage being disposed on each of two sides of the C-shaped mount body wherein a nut is emplaced in each columnar passage to receive two screws for fastening and conjoinment to an inner side of the reverse C-shape mount body.

2. The beverage holder of claim 1, wherein said oblique-faced conical block body comprises a through-hole in a center and a projecting rim at one end of said oblique-faced conical block body for extending into said recess on the mounting plate of the beverage holder and a recess having spur gear teeth formed along an inner edge of an opposite end of the oblique-faced conical block body to enable the insertion and conjoinment of the oblique-faced conical block body to said C-shaped mount body.

3. The beverage holder of claim 2, wherein the projecting rim of said oblique-faced conical block is inserted into the recess in the back surface on the mounting plate and the projecting rim on the C-shaped mount body is inserted into the recess on the oblique-faced conical block.

4. The beverage holder of claim 1, wherein the reverse C-shaped mount body includes two through-holes aligned with the two columnar passages on the C-shaped mount body that enable the insertion of the two screws into the two through-holes for fastening and conjoinment to the C-shaped mount body.

5. The beverage holder of claim 1, wherein the projecting rim of the C-shaped mount body is inserted into the recess in the back surface on the mounting plate, and a screw is ensleeved with a washer and fastened to a nut emplaced in the center hole of the C-shaped mount body and, furthermore, the reverse C-shaped mount body is fastened onto the C-shaped mount body to thereby fix and install the mounting plate onto the a tube or a rod in a vertical state.

6. The beverage holder of claim 1, wherein the bottom mount has a downward cavity in a base plate of said bottom mount, enabling a bottom section of a beverage container to be nested on the bottom mount.

7. The beverage holder of claim 1, further comprising a minimum of two rubber plates which after being rolled are placed between the C-shaped mount body and the reverse C-shaped mount body to fit in with different diameters of tubes or rods.

8. A beverage holder comprising a mounting plate, a bottom mount, two clip arms, and a clip arm hinge rod, the mounting plate including a back surface having a recess with spur gear teeth formed along an inner edge and a through-hole, a mounting frame being comprised of a C-shaped mount body and a reverse C-shaped mount body, the clip arms including inverted U-shaped rods having at least one rib at an inner side of the rods, two arc-shaped retaining elements consisting of an arc-shaped plate body having at least one hinge tab at an outer side, a hinge shaft inserted through or extending from the hinge tab, and at least one transfer rod spring sleeved onto the hinge shaft, the two arc-shaped retaining elements being respectively hinged to inner sides of the two clip arms and being foldable downward and automatically returning upward to an original horizontal state due to a tension of the spring.

\* \* \* \* \*